United States Patent [19]
Rind

[11] Patent Number: 5,121,616
[45] Date of Patent: Jun. 16, 1992

[54] STEERING LOCK FOR MOTOR VEHICLES

[75] Inventor: Heinz Rind, Olching, Fed. Rep. of Germany
[73] Assignee: Tibbe KG, Fed. Rep. of Germany
[21] Appl. No.: 499,256
[22] PCT Filed: Aug. 1, 1989
[86] PCT No.: PCT/EP89/00899
§ 371 Date: Jun. 4, 1990
§ 102(e) Date: Jun. 4, 1990
[87] PCT Pub. No.: WO90/01437
PCT Pub. Date: Feb. 22, 1990

[30] Foreign Application Priority Data

Aug. 4, 1988 [DE] Fed. Rep. of Germany ... 8809976[U]
Oct. 12, 1988 [DE] Fed. Rep. of Germany ... 8812812[U]

[51] Int. Cl.$^5$ ............................................. B60R 25/02
[52] U.S. Cl. ........................................ 70/186; 70/248
[58] Field of Search ................... 70/247, 248, 182–187

[56] References Cited

U.S. PATENT DOCUMENTS

| | | | |
|---|---|---|---|
| 1,487,863 | 3/1924 | Lavigne | 70/183 |
| 1,819,259 | 8/1931 | Palmer | 70/185 X |
| 2,163,853 | 6/1939 | Pond | 70/185 |
| 2,890,581 | 6/1959 | Lewis | 70/248 |
| 3,250,101 | 5/1966 | Jeavons et al. | 70/186 X |
| 3,566,633 | 3/1971 | Borck | 70/248 X |
| 3,566,634 | 3/1971 | Borck | 70/248 X |
| 3,795,122 | 3/1974 | Lipschutz | 70/182 |
| 4,413,491 | 11/1983 | Thirion | 70/186 X |
| 5,036,686 | 8/1991 | Ichinose | 70/186 |

FOREIGN PATENT DOCUMENTS

| | | |
|---|---|---|
| 0265826 | 5/1988 | European Pat. Off. . |
| 0268879 | 6/1988 | European Pat. Off. . |
| 2711701 | 9/1978 | Fed. Rep. of Germany . |
| 3408514 | 6/1985 | Fed. Rep. of Germany . |
| 1596980 | 9/1981 | United Kingdom . |

*Primary Examiner*—Renee S. Luebke
*Assistant Examiner*—Suzanne L. Dino
*Attorney, Agent, or Firm*—Bacon & Thomas

[57] ABSTRACT

A steering lock for motor vehicles comprises a locking element which prevents rotation of the vehicle's steering shaft (2). The locking element is spring-loaded into a locking portion and can be shifted to the unlocking position against the action of the spring by a locking cylinder (3) and a rotary eccentric (16). The locking element consists of a locking sleeve (8) which surrounds the steering shaft (2), is mounted axially mobile but secured to remain fixed against rotation in the steering lock housing (1), and has locking teeth (12) at one end. The locking sleeve (8) co-operates with a locking ring (7) fastened to the steering shaft (2) and which also has locking teeth (11) at one end. An actuating lever (17) for the locking sleeve (8) is pivotally mounted in the steering lock housing (1), is provided with two arms (18, 19) which engage with the locking sleeve (8) or rest against the eccentric (16), and is loaded by a leg spring (23) which moves the locking sleeve (8) into the locking position, in which the locking teeth (12) of the locking sleeve (8) interlock with the locking teeth (11) of the locking ring (7).

9 Claims, 8 Drawing Sheets

STEERING LOCK FOR MOTOR VEHICLES

The invention relates to a steering lock for motor vehicles with a locking element for preventing rotation of the vehicle steering shaft, the element being spring-urged into the locking position and being capable of being shifted into the unlocking position against the action of the spring-loading by means of a lock cylinder acting through a rotary eccentric.

Such motor vehicle steering locks are known in a range of different forms, including those in which the locking element can only move into the locking position under the action of its spring loading when the key has been partially or completely withdrawn from the lock cylinder or its core. As a rule the locking element is in the form of an axially movable locking bolt which engages in a notch in the steering shaft or in a locking sleeve secured to it. However other locking elements are also known.

The invention is based on solving the problem of providing a steering lock for motor vehicles of the kind stated in the introduction, which is of simple and light construction yet achieves effective and secure locking of the vehicle steering shaft and, in doing this, can withstand high torques.

This problem is solved by the features stated in the characterising part of claim 1. Advantageous embodiments of the motor vehicle steering lock according to the invention are given in the remaining claims.

In a motor vehicle steering lock according to the invention the locking element is formed by a locking sleeve which is displaceable along the steering shaft and co-operates with a locking ring on the steering shaft so as to couple it mechanically to the steering each housing so that the steering shaft can no longer be turned. A two-armed actuating lever is provided for the locking sleeve and is pivotally mounted in the steering lock housing and by means of which the locking sleeve is spring-urged into the locking position and is also movable into the unlocking position by means of the eccentric actuated by the lock cylinder. The spring loading is produced by a hairpin spring which engages on the one hand against the steering lock housing and on the other hand against the actuating lever.

If the lock cylinder is arranged in the steering lock housing in such a way that its longitudinal axis and the longitudinal axis of the steering shaft extend in mutually parallel planes and in fact at different inclinations to a common reference plane perpendicular to these planes, then the pivotal axis of the actuating lever can extend in a third parallel plane and in fact perpendicular to the longitudinal axis of the lock cylinder, and the two arms of the actuating lever can be arranged spaced apart and substantially perpendicular to one another so that they can pivot in two mutually parallel planes which are perpendicular to the third plane. As the longitudinal axis of the steering shaft makes, with the pivotal plane of the arm which co-operates with the locking sleeve, the acute included angle by which the lock cylinder, of which the longitudinal axis extends in the plane of pivoting of the arm that cooperates with the eccentric, is inclined with respect to the steering shaft, every pivotal movement of the arm that co-operates with the locking sleeve causes a correspondingly reduced displacement of it along the axis of the steering shaft, which, for a given pivotal movement of the arm, is all the shorter, the greater is the acute angle.

In order to eliminate this reduction in view of the fact that already the range is limited within which the actuating lever can be pivoted by means of the eccentric and the arm that co-operates with the locking sleeve can move back and forth, it is of advantage to arrange the pivotal axis of the actuating lever both perpendicular to the axis of the lock cylinder and also perpendicular to the axis of the steering shaft so that the arm of the actuating lever that co-operates with the eccentric is able to pivot in the plane containing the axis of the lock cylinder and parallel to the axis of the steering shaft and the arm of the actuating lever that co-operates with the locking sleeve is laterally movable substantially parallel to the axis of the steering shaft. In this way any reduction of movement between the eccentric and the locking sleeve is avoided, so that it can be shifted back and forth over a relatively long extent.

Two embodiments of the motor vehicle steering lock according to the invention are described in the following by way of example in conjunction with the drawings.

Figure 1:
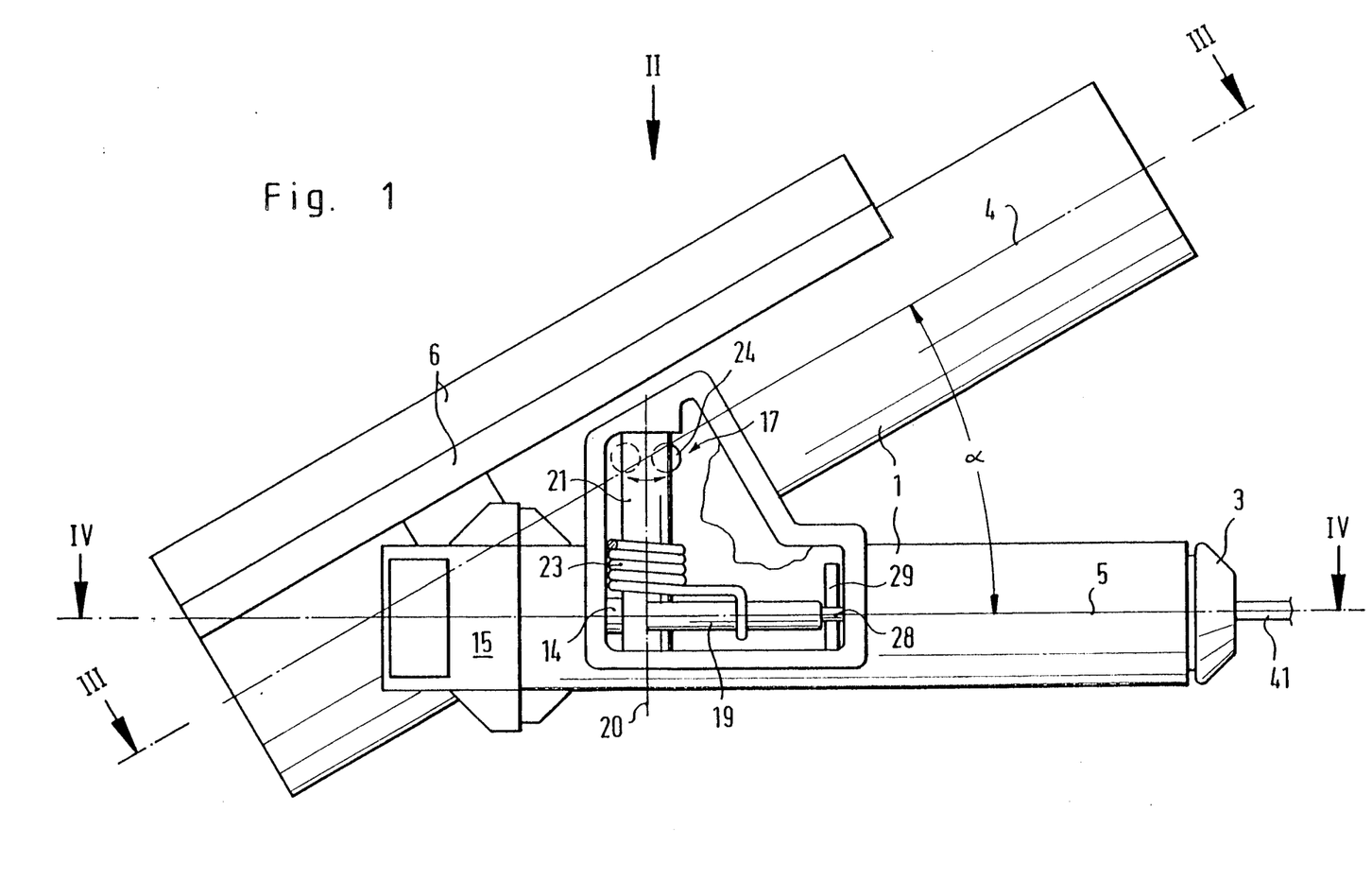
FIG. 1 is a side view of the first embodiment.
Figure 2:
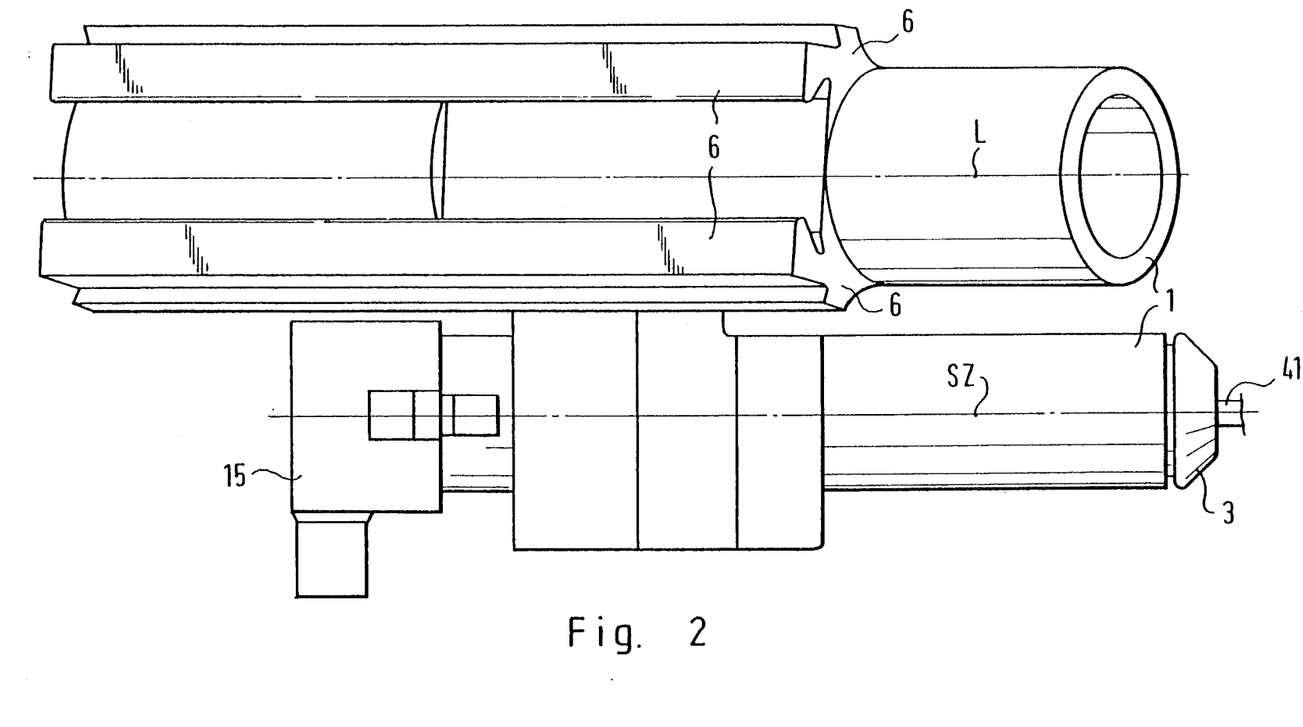
FIG. 2 is a plan view in the direction of the arrow II in FIG. 1.

The two steering locks illustrated each comprise a housing 1 with two sleeve-shaped portions in which the hollow steering shaft 2 of the associated motor vehicle and a lock cylinder 3 are respectively arranged. As can be seen in FIGS. 1 and 2 and in FIGS. 8 and 9 the two portions of the steering lock housing 1 are arranged adjacent one another and mutually inclined so that the longitudinal axis 4 of the steering shaft and the longitudinal axis 5 of the lock cylinder extend in mutually parallel planes L and SZ, and in fact at different inclinations with respect to a common reference plane which is perpendicular to these planes L and SZ and accordingly to the plane of the drawing in FIGS. 1 and 8, in such a way that the two planes containing respectively the axis 4 of the steering shaft and the axis 5 of the lock cylinder and represented by the line III—III and IV—IV in FIG. 1 or by the line IX—IX and the lock cylinder axis 5 in FIG. 8 make a mutually included angle α of 30°. On that portion of it which encloses the steering shaft 2 the lock housing 1 is provided with external longitudinal ribs 6 for adjustable securing to the vehicle.

Secured to the steering shaft 2 is a locking ring 7. Associated with it is a locking sleeve 8 which surrounds the steering shaft 2 and is mounted in the steering lock housing 1 or, rather, the relevant portion of it, to be secured against rotation, but to be able to move axially. For this purpose the locking sleeve 8 is provided with three external longitudinal grooves 9 distributed uniformly around its periphery, engaged by three internal longitudinal ribs 10 of corresponding cross-section in the steering lock housing 1. The locking ring 7 and the locking sleeve 8 each have a ring of locking teeth 11 or 12 on their mutually opposed ends.

The lock cylinder 3 is provided with a rotatable and axially movable core 13, to which is secured a switch spindle 14 extending co-axially with respect to the core 13 and serving on the one hand for actuating an ignition and starting switch 15 secured on the steering lock housing or on the associated portion of it, and on the other hand for displacing the locking sleeve 8. For this purpose the switch spindle 14 is provided with an eccentric 16.

The displacement of the locking sleeve 8 takes place with the aid of an actuating lever 17 having two arms 18 and 19 and mounted to pivot in the steering lock housing 1, in particular, in that portion of it which is associated with the lock cylinder 3.

In the steering lock according to FIGS. 1 to 7 the pivotal axis 20 of the actuating lever 17 extends in a plane A parallel to the longitudinal planes L and SZ of the steering shaft 2 and of the lock cylinder 3, and in fact perpendicular to the axis 5 of the lock cylinder. The two arms 18 and 19 of the actuating lever 17 are arranged spaced apart along the pivotal axis 20 and in fact at the two ends of a sleeve-shaped central portion 21 of the actuating lever 17, through which extends a bearing pin 22 and on which a hairpin spring 23 is mounted, with one of its limbs engaging the actuating lever 17 or its arm 19 and the other limb engaging the steering lock housing 1. The two arms 18 and 19 are orientated substantially perpendicular to one another so as to extend across from the switch spindle 14 towards the locking sleeve 8 and along the switch spindle 14 towards its eccentric 16.

The arm 18 of the actuating lever 17 that co-operates with the locking sleeve 8 is provided with a ball-shaped end 24 by which it engages in a radial opening 25 in the locking sleeve 8, this opening being of slot-like shape and extending in the direction of the periphery of the locking sleeve 8. That arm 19 of the actuating lever 17 which co-operates with the eccentric 16 on the switch spindle 14 is provided with a safety pin 28 which is axially displaceable in a longitudinal bore 26 and is acted on by a helical coil compression spring 27 arranged in the bore, the pin 28 co-operating with a radial projection 29 on the switch spindle 14, as to be explained later, and which in the case illustrated is a circular disc.

Figure 8:
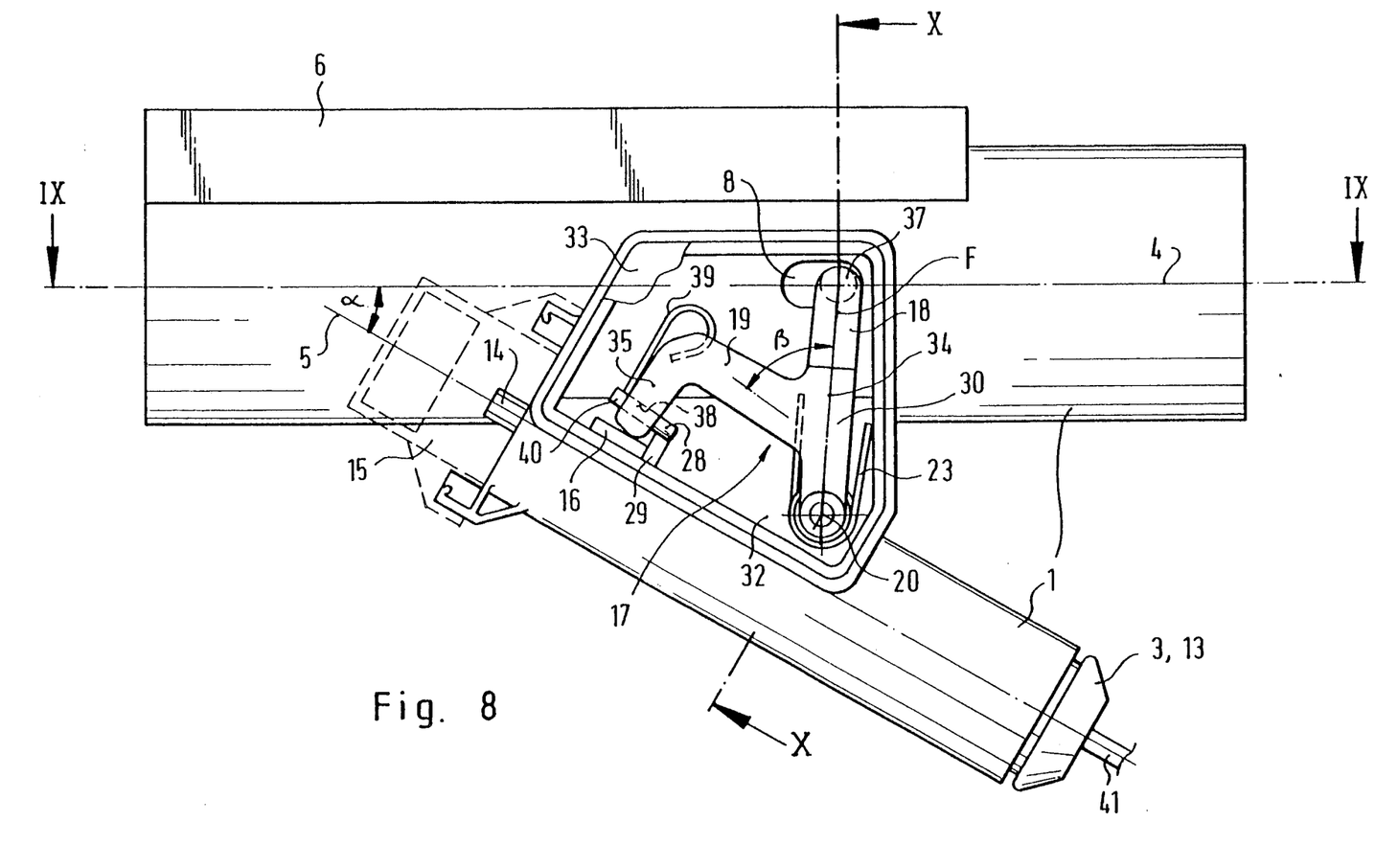
FIG. 8 is a side view of the second embodiment.
Figure 9:
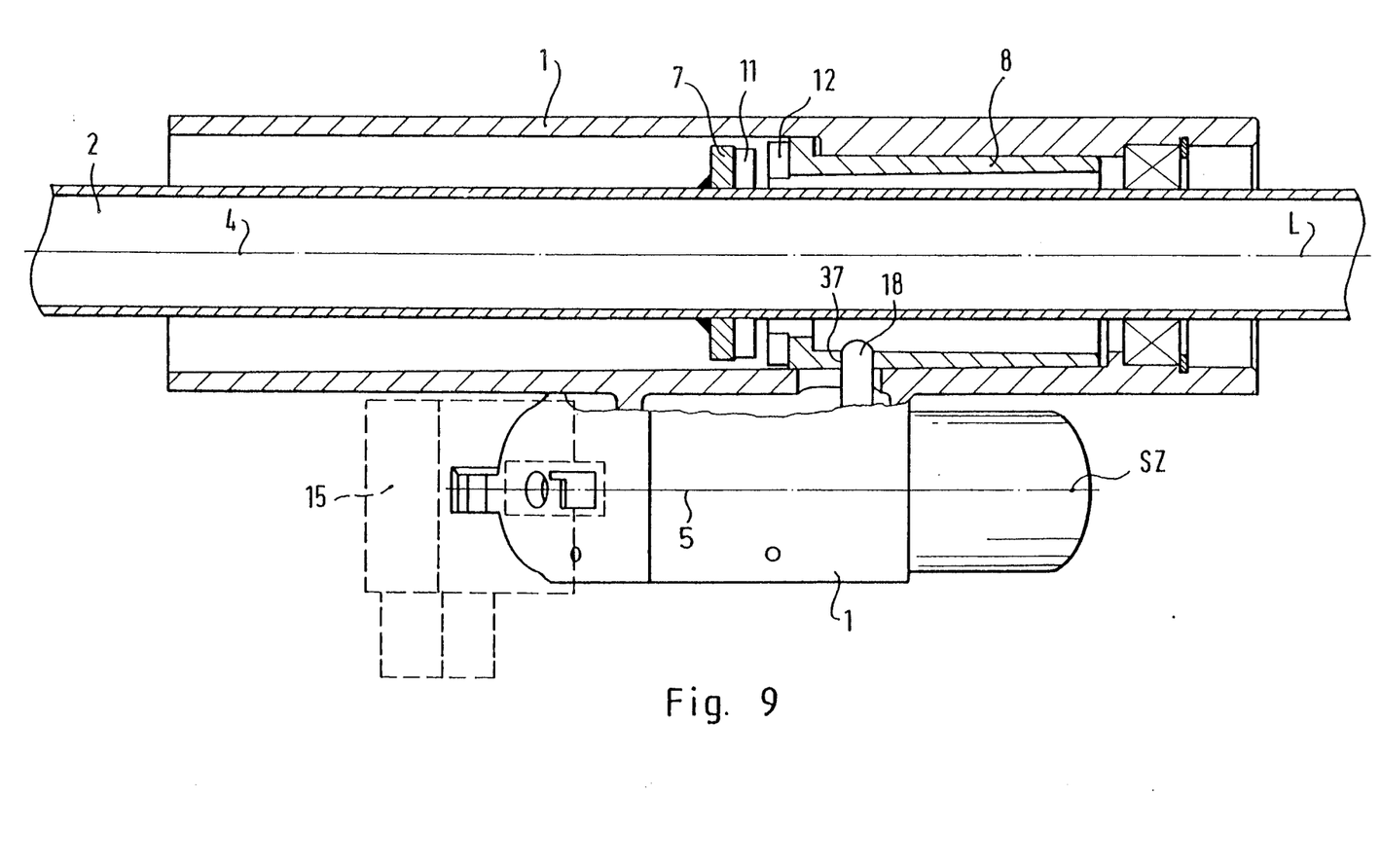
FIG. 9 is a section along the line IX—IX in FIG. 8.
Figure 10:
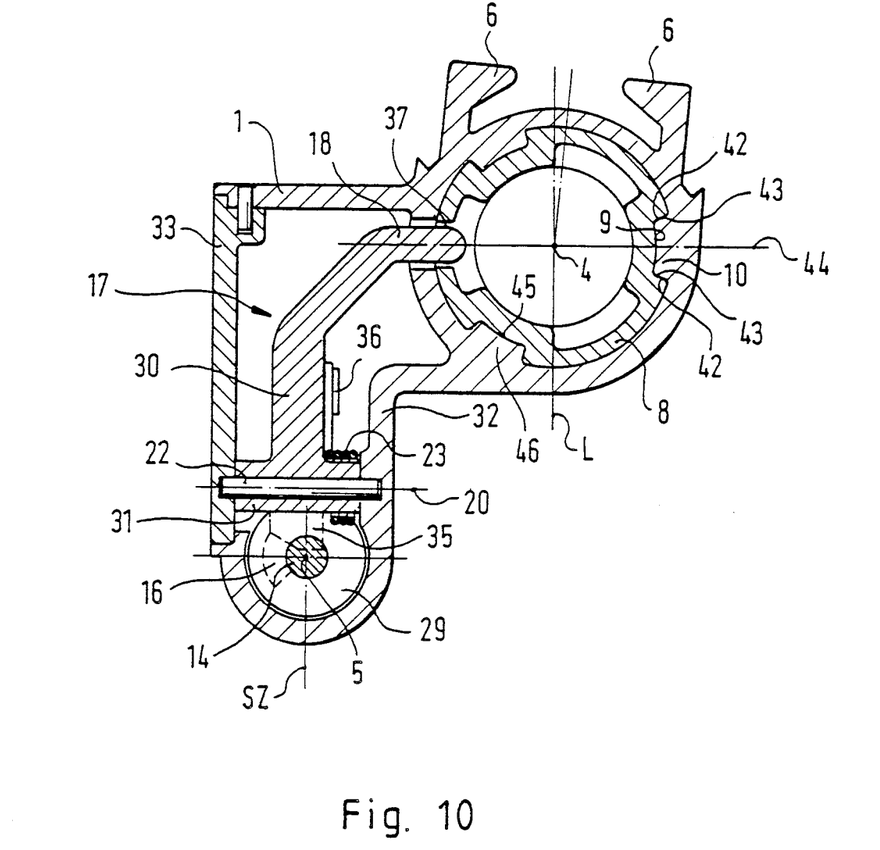
FIG. 10 is a section along the line X—X in FIG. 8.

In the steering lock shown in FIGS. 8 to 10 the pivotal axis 20 of the actuating lever 17 extends between the lock cylinder 3 and the eccentric 16 and perpendicular to the two mutually parallel planes L and SZ and therefore also perpendicular to the axis 4 of the steering shaft and the axis 5 of the lock cylinder, with the two arms 18 and 19 arranged spaced apart from one another and substantially perpendicular to one another for acting on the locking sleeve 8 and for engaging the eccentric 16. The actuating lever 17 has a foot 30 perpendicular to the pivotal axis 20 and having a sleeve-shaped end 31 through which extends the bearing pin 22 which is inserted in a wall 32 and an opposing cover 33 of the steering lock housing 1, which embrace the sleeve-shaped end 31 of the foot 30. The two arms 18 and 19 of the actuating lever 17 extend respectively from the other end of the foot 30 away in the plane F containing the pivotal axis 20 and the longitudinal axis 34 of the foot, towards the locking sleeve 8 or with an included acute angle β with the plane F along the switch spindle 14 to the eccentric 16, the arm 19 which co-operates with the latter having an end 35 which is bent back at right angles towards the eccentric 16. Arranged on the sleeve-shaped end 31 of the foot 30 of the actuating lever is the hairpin spring 23 which with its one limb engages a projection 36 on the foot 30 whilst its other limb bears on the steering lock housing 1.

The arm 18 of the actuating lever 17 that co-operates with the locking sleeve 8 engages with its free end in a matching radial opening 37 in the locking sleeve 8. The safety pin 28 of the arm 19 co-operating with the eccentric 16 on the switch spindle 14 and co-operating with the radial projection 29 on the switch spindle 14 is axially displaceable in a transverse bore 38 in the bent-back end 35 of the arm 19 and is loaded by a leaf spring 39. The leaf spring 39 is secured to the arm 19 and extends parallel to its bent-back end 35 and engages with its free end in a transverse groove 40 in the safety pin 28, provided at that end of it which is furthest from the projection 29, and which projects from the bent-back end 35 of the arm 19.

Figure 3:
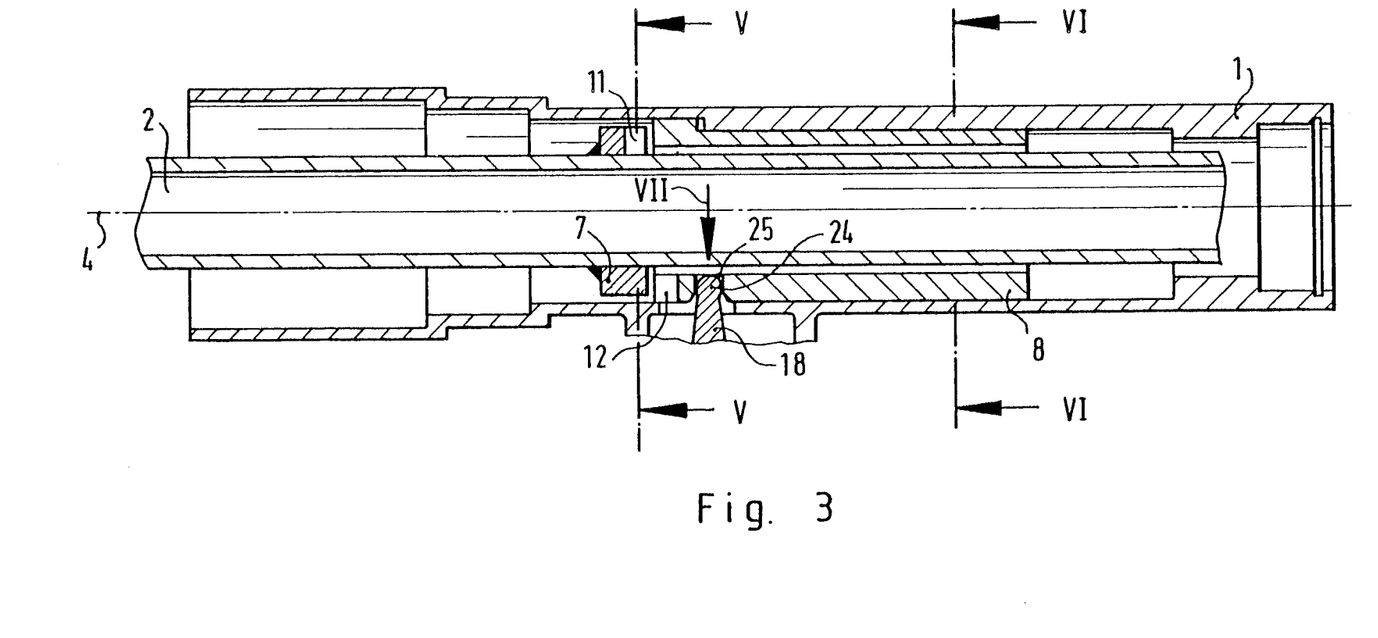
FIG. 3 is a section along the line III—III in FIG. 1.

The locking sleeve 8 is axially displaceable in the steering lock housing 1, or rather in the relevant portion of it, between the unlocking position illustrated in FIGS. 3 and 9 and a locking position in which its locking teeth 12 interengage with the locking teeth 11 on the locking ring 7 so that the steering shaft 22 can no longer be turned. The hairpin spring 23, acting through the actuating lever 17, urges the locking sleeve 8 into the locking position from which the locking sleeve 8 can be shifted into the unlocking position by corresponding actuation of the lock cylinder 3 acting through the eccentric 16 and likewise the actuating lever 17, the actuating lever 17 being pivoted by the eccentric 16 against the action of the hairpin spring 23.

In the steering lock according to FIGS. 8 to 10, on pivoting of the actuating lever 17, the arm 19 co-operating with the eccentric 16 on the bent-back end 35 moves in the plane SZ containing the axis 5 of the lock cylinder and parallel to the axis 4 of the steering shaft and the arm 18 co-operating with the locking sleeve 8 moves substantially parallel to the axis 4 of the steering shaft, and in fact the last-mentioned arm 18 of the actuating lever 17 perpendicular to the axis of the arm, namely transversely or laterally. The locking sleeve 8 is therefore moved through exactly the same distance by which the free end of the arm 18 engaging in its radial opening 37 also shifts.

Figure 4:
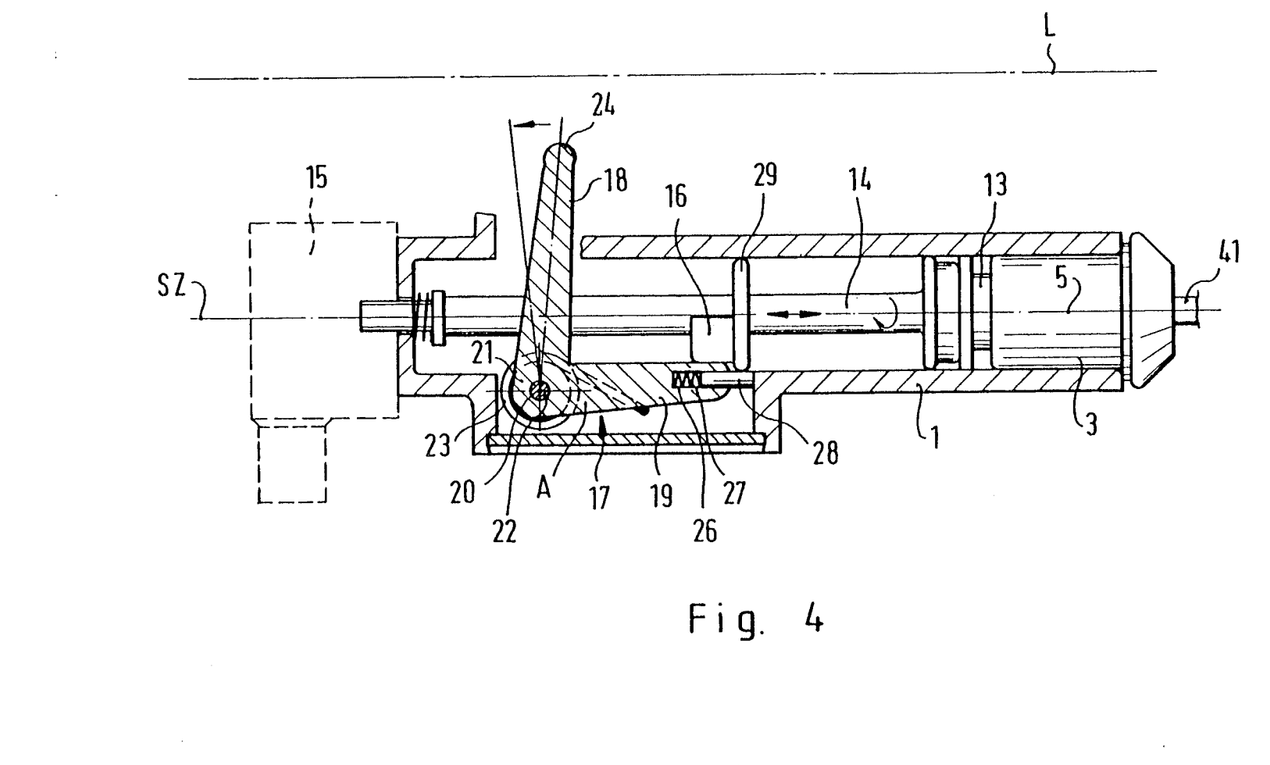
FIG. 4 is a section along the line IV—IV in FIG. 1.
Figure 5:
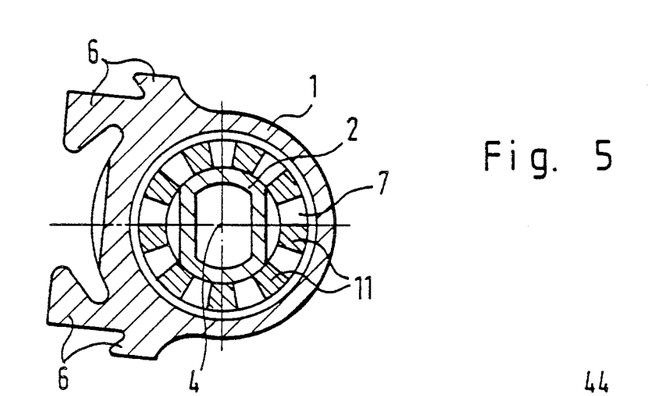
FIG. 5 is a section along the line V—V in FIG. 3.
Figure 6:
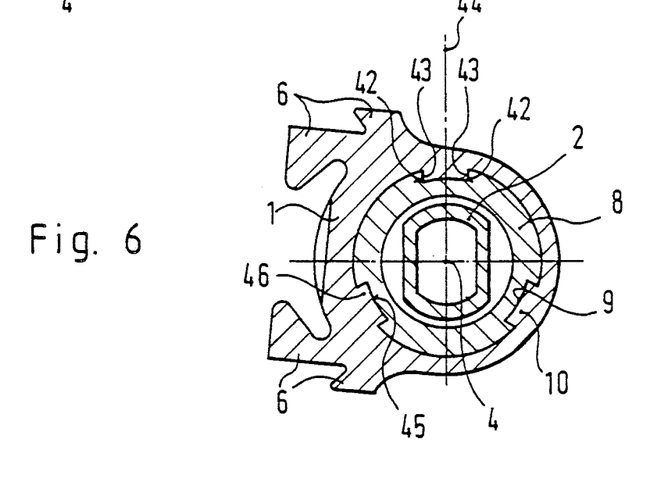
FIG. 6 is a section along the line VI—VI in FIG. 3.
Figure 7:
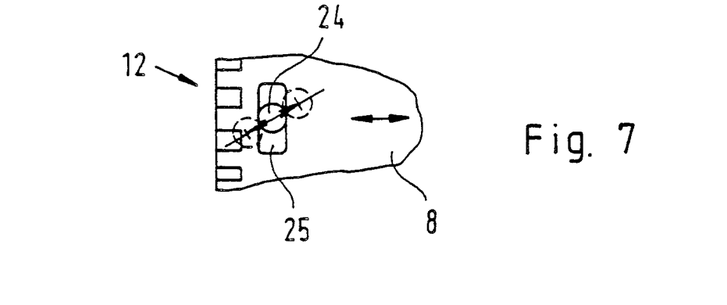
FIG. 7 is a view looking in the direction of the arrow VII in FIG. 3.

The steering lock is illustrated in the 'Drive' position in which the locking sleeve 8 is in the unlocking condition and the arm 19 of the actuating lever 17 or the bent-back end 35 of the arm 19 engages the eccentric on the switch spindle 14 and furthermore the ignition and starter switch 15 completes the ignition circuit of the engine of the vehicle. In order to lock the steering shaft 2 against rotation, first the core 13 of the lock cylinder 3 is rotated by the use of the key 41 placed in it, so that the eccentric 16 moves away from below the arm 19 or, rather its bent-back end 35 and the ignition switch 15 interrupts the ignition circuit to the engine of the vehicle. The actuating lever 17 is then, it is true, no longer retained by the eccentric 16 in that angular position which is shown in FIG. 4 or FIG. 8, but in fact by the safety pin 28 of the arm 19 which engages against the projection 29 on the switch spindle 14. Only when, after return rotation of the core 13 into the initial position which permits insertion and removal of the key, the key 41 is withdrawn from the core 13, can the actuating lever 17 pivot back in a counter-clockwise direction from the position shown in FIG. 4 or 8 under the action of the hairpin spring 23, in order to shift the locking sleeve 8 into the locking position. In fact the withdrawal of the key has the effect that the core 13 as well as the switch spindle 14 displace axially to the right in FIG. 4 or 8, so that the projection 29 on the switch spindle 14 moves away clear of the safety pin 28 of the actuating lever 17 and its support ceases.

Modifications of the embodiments which are illustrated and described are entirely possible. For example the side flanks 42 of the longitudinal grooves 9 in the locking sleeve 8 and the side flanks 43 of the longitudinal ribs 10 in the steering lock housing 1 could have an orientation different from that illustrated in FIGS. 6 and 10, which is radial with regard to the axis 4 of the steering shaft, in and particular they could extend parallel to the respective central longitudinal plane 44 or could converge away from the base 45 of the respective groove and diverge away from the foot 46 of the respective rib, which opposes spreading out of the steering lock housing 1 or rather of that portion of it which receives the locking sleeve 8, when the steering shaft 2, in its locked condition, is acted on by a large torque. In particular in the steering lock shown in FIGS. 8 to 10 the lock cylinder 3 can be inclined in relation to the steering shaft 2 so that the longitudinal axis 5 of the lock cylinder extending in the plane SZ makes an acute included angle α in the region of 20° to 60° with the projection of the axis longitudinal 4 the steering shaft on the plane SZ.

I claim:

1. A steering lock for the steering shaft of a motor vehicle having a locking element for locking the steering shaft against rotation, said steering lock comprising:

a steering lock housing, at least a portion of said steering shaft being located in said steering lock housing;

a locking ring secured to the steering shaft within said steering lock housing and provided on one end with locking teeth;

a locking sleeve surrounding the steering shaft, said locking sleeve mounted non-rotatably but so as to be axially displaceable in said steering lock housing and said locking sleeve having locking teeth on one end thereof facing the locking teeth on said locking ring;

actuator means mounted in the steering lock housing for engaging and axially displacing said locking sleeve;

a spindle rotatably supported within said steering lock housing, said spindle having an eccentric mounted thereon for rotation with said spindle whereby upon rotation of said spindle, said eccentric engages said actuator means to cause said locking sleeve to be axially displaced;

means for biasing said locking sleeve into a locking position wherein the locking teeth on said locking sleeve engage the locking teeth on said locking ring to prevent rotation of said steering shaft;

means for moving said locking sleeve into an unlocking position which comprises a lock cylinder having a rotatable core connected to said spindle and being adapted to rotate in response to manual rotation of a key receivable within said lock cylinder;

wherein said actuator means comprises an actuator lever pivotally mounted about an axis intermediate its length within said steering lock housing, said actuator lever including first and second arms, said first arm being engageable with said locking sleeve for axially displacing said locking sleeve in response to pivoting of said actuator lever and said second arm being engageable by said eccentric for pivoting said actuator lever; and wherein the axis about which said actuator lever pivots extends perpendicular to the longitudinal axis of the lock cylinder and in a plane parallel to two mutually parallel planes including the steering shaft longitudinal axis and the lock cylinder longitudinal axis respectively, said lock cylinder being radially spaced from the steering shaft and inclined with respect to it, and the first and second arms of said actuator lever being spaced from one another and substantially perpendicular to one another to extend across said spindle towards said locking sleeve and along the spindle towards said eccentric respectively.

2. A steering lock as claimed in claim 1, wherein said locking sleeve is spline connected to said steering lock housing to thereby prevent rotational movement of said locking sleeve but permitting axial movement thereof, said spline connection being constituted by external longitudinal grooves formed on said locking sleeve and internal longitudinal ribs of corresponding cross-section in said steering lock housing, said longitudinal grooves and ribs including side flanges which extend parallel to or converge in a direction extending away from the steering shaft.

3. A steering lock as claimed in claim 1, wherein said biasing means comprises a hairpin spring acting between said actuator means and said steering lock housing.

4. A steering lock as claimed in claim 1, wherein said spindle is also axially movable within said steering lock housing when rotated to move said locking sleeve into said unlocking position, and further comprising:

a projection fixedly secured to said spindle adjacent said eccentric;

a bore located in an end portion of the second arm of said actuator lever; and a spring-loaded safety pin located within said bore and being biased to engage said projection upon said axial displacement of said spindle and to prevent said actuator lever from displacing said sleeve into said locking position until said key has been partially or completely removed from the lock cylinder.

5. A steering lock for the steering shaft of a motor vehicle having a locking element for locking the steering shaft against rotation, said steering lock comprising:

a steering lock housing, at least a portion of said steering shaft being located in said steering lock housing;

a locking ring secured to the steering shaft within said steering lock housing and provided on one end with locking teeth;

a locking sleeve surrounding the steering shaft, said locking sleeve mounted non-rotatably but so as to be axially displaceable in said steering lock housing and said locking sleeve having locking teeth on one end thereof facing the locking teeth on said locking ring;

actuator means mounted in the steering lock housing for engaging and axially displacing said locking sleeve;

a spindle rotatably supported within said steering lock housing, said spindle having an eccentric mounted thereon for rotation with said spindle whereby upon rotation of said spindle, said eccentric engages said actuator means to cause said locking sleeve to be axially displaced;

means for biasing said locking sleeve into a locking position wherein the locking teeth on said locking sleeve engage the locking teeth on said locking ring to prevent rotation of said steering shaft;

means for moving said locking sleeve into an unlocking position which comprises a lock cylinder having a rotatable core connected to said spindle and being adapted to rotate in response to manual rotation of a key receivable within said lock cylinder;

wherein said actuator means comprises an actuator lever pivotally mounted about an axis intermediate its length within said steering lock housing, said actuator lever including first and second arms, said first arm being engageable with said locking sleeve for axially displacing said locking sleeve in response to pivoting of said actuator lever and said second arm being engageable by said eccentric for pivoting said actuator lever; and wherein the axis about which said actuator lever pivots extends perpendicular to two mutually parallel planes including the steering shaft longitudinal axis and the lock cylinder longitudinal axis respectively, said lock cylinder being radially spaced from the steering shaft and inclined with respect to it, and the first and second arms of said actuator level being spaced from one another and substantially perpendicular to one another to be movable laterally substantially parallel to the longitudinal axis of the steering shaft and respectively to extend along the spindle towards said eccentric and to be pivotable in the plane including the lock cylinder longitudinal axis.

6. A steering lock as claimed in claim 5, wherein the axis about which said actuator lever pivots is located between said lock cylinder and said eccentric and wherein said actuator lever includes a foot which is perpendicular to said pivot axis and from which said first and second arms project, the first arm extending in a plane containing the pivot axis of the actuator lever and the longitudinal axis of the foot, and toward the locking sleeve, and the second arm including a portion extending at an acute angle with respect to said plane and toward the eccentric and an end portion bent at a right angle thereto.

7. A steering lock as claimed in claim 5, wherein said locking sleeve is spline connected to said steering lock housing to thereby prevent rotational movement of said locking sleeve but permitting axial movement thereof, said spline connection being constituted by external longitudinal grooves formed on said locking sleeve and internal longitudinal ribs of corresponding cross-section in said steering lock housing, said longitudinal grooves and ribs including side flanges which extend parallel to or converge in a direction extending away from the steering shaft.

8. A steering lock as claimed in claim 5, wherein said biasing means comprises a hairpin spring acting between said actuator means and said steering lock housing.

9. A steering lock as claimed in claim 5, wherein said spindle is also axially movable within said steering lock housing when rotated to move said locking sleeve into said unlocking position, and further comprising:

a projection fixedly secured to said spindle adjacent said eccentric;

a bore located in an end portion of the second arm of said actuator lever; and a spring-loaded safety pin located within said bore and being biased to engage said projection upon said axial displacement of said spindle and to prevent said actuator lever from displacing said locking sleeve into said locking position until said key has been partially or completely removed from the lock cylinder.

* * * * *

UNITED STATES PATENT AND TRADEMARK OFFICE
CERTIFICATE OF CORRECTION

PATENT NO. : 5,121,616

DATED : June 16, 1992

INVENTOR(S) : Heinz Rind

It is certified that error appears in the above-identified patent and that said Letters Patent is hereby corrected as shown below:

In the Abstract, line 4, change "portion" to --position--.

Column 1, lines 27 to 30, delete the sentences:
"This problem is solved by the features stated in the characterising part of claim 1. Advantageous embodiments of the motor vehicle steering lock according to the invention are given in the remaining claims."

Column 1, line 35, change "each" to --lock--.

Column 3, line 29, delete "from".

Column 4, line 46, change "position" to --condition--;
lines 47 and 48, change "condition" to --position--.

Column 5, line 8, change "entirely" to --certainly--;
line 27, change "axis longitudinal" to --longitudinal axis--.

UNITED STATES PATENT AND TRADEMARK OFFICE
CERTIFICATE OF CORRECTION

PATENT NO. : 5,121,616

DATED : June 16, 1992

INVENTOR(S) : Heinz Rind

It is certified that error appears in the above-identified patent and that said Letters Patent is hereby corrected as shown below:

Column 7, line 28, change "level" to --lever--.

Signed and Sealed this

Twenty-first Day of September, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,121,616

DATED : June 16, 1992

INVENTOR(S) : Heinz Rind

It is certified that error appears in the above-identified patent and that said Letters Patent is hereby corrected as shown below:

Column 6, line 25, change "flanges" to --flanks--.

Column 8, line 16, change "flanges" to --flanks--.

Signed and Sealed this

Second Day of November, 1993

*Attest:*

BRUCE LEHMAN

*Attesting Officer*   *Commissioner of Patents and Trademarks*